2,963,738

STAMPING PUNCH FOR THE MANUFACTURE OF SEALING INSERTS OF THERMOPLASTIC ARTIFICIAL MATERIAL IN CLOSING CAPS FOR CONTAINERS, AS BOTTLES

Adolf Brandes, Frankenthal, Pfalz, and Albert Christmann and Hans Willersinn, both of Frankenthal, Germany, assignors to Fa. Bender-Werke G.m.b.H., Frankenthal, Pfalz, Germany, a corporation of Germany Filed Mar. 27, 1959, Ser. No. 802,552

Claims priority, application Germany Mar. 28, 1958

1 Claim. (Cl. 18—5)

The present invention relates to a stamping punch for the manufacture of sealing inserts of thermoplastic artificial material in closing caps for containers, as bottles.

It is one object of the present invention to manufacture sealing inserts of thermoplastic aritficial material, which sealing inserts are equipped with a flat center portion and an annular bead of a smaller diameter than that of the bottom of the cap. In accordance with this manufacture, the mass of artificial material is first fed into the cap in a first working step and then properly shaped by the stamping punch in a second working step. The stamping punch is, as to its outer shape, complementary to the inner shape of the cap and carries an annular recess for the formation of the bead, which recess is disposed at a predetermined distance inside of the outer periphery of the stamping punch. Furthermore, the stamping punch has, in the space between the receess and its outer periphery, radial grooves for the purpose to permit escape of air and of receiving superfluous artificial material.

In accordance with the present invention, the punching punch comprises an outer cylindrical hollow body and a mandrel centrally guided therein, both parts of the punch being independently axially movable. Upon engaging of the outer cylindrical hollow body with the outer portion of the bottom of the cap, the inner mandrel is pushed towards the inner part of the bottom of the cap for a predetermined amount.

A stamping punch formed in accordance with the present invention provides the possibility to punch the center portion of the insert with a predetermined thickness and to form the bead surrounding the center portion completely exact. For this reason, the stamping punch, designed in accordance with the present invention, is particularly also suitable for the working of different types of thermoplastic artificial masses.

With these and other objects in view, which will become apparent in the following detailed description, the present invention will be clearly understood in connection with the accompanying drawings, in which.

Figure 1:
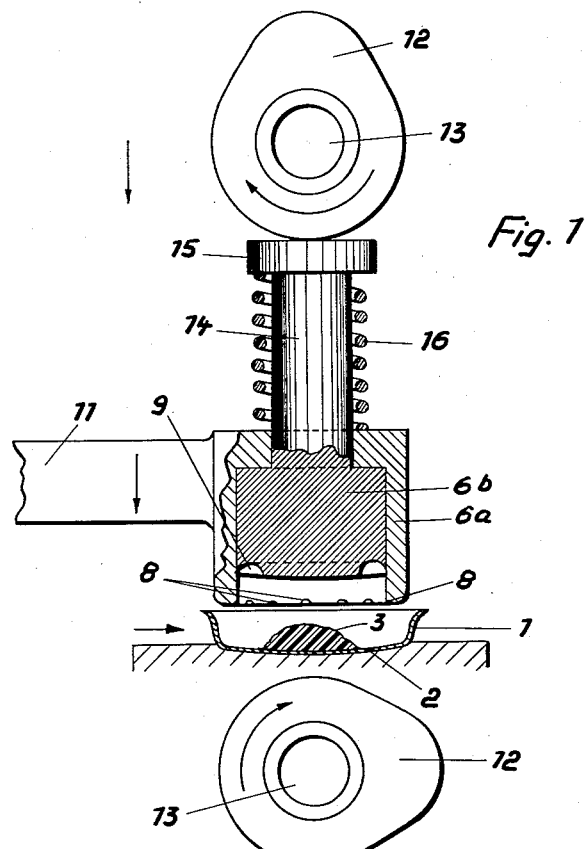
Figure 1 is a front elevation, partly in section, of the stamping punch structure.

Referring now to the drawings, the pre-shaped caps 1 made of sheet metal have a bottom portion 2. A predetermined amount of thermoplastic artificial material 3 is fed to the bottom portion 2 of the cap 1. The cap 1 is disposed below the stamping punch, as clearly shown in Fig. 1. The stamping punch serves the purpose to stamp sealing inserts which have a median center portion 4 and an annular bead 5. (See Figs. 3 and 4.)

A stamping punch is used for this purpose, which comprises an outer cylindrical hollow body 6a and a mandrel 6b centrally guided in the hollow body 6a. The members 6a and 6b are axially movable independently from each other. The outer cylindrical hollow body 6a has in addition at its end face radial grooves 8 through which the air may escape and into which superfluous plastic material may enter.

The end face of the mandrel 6b is equipped with an annular recess 9 adapted for the formation of the bead 5.

Figure 2:
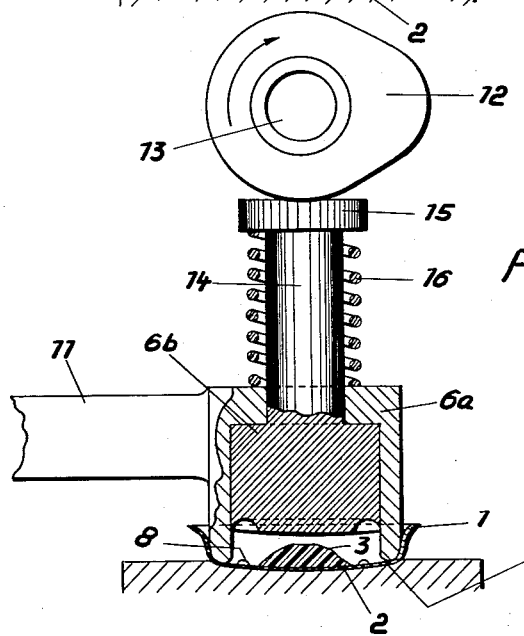
Figure 2 is a front elevation, partly in section, of the stamping punch structure shown in Fig. 1, yet, in a different working position.
Figure 3:
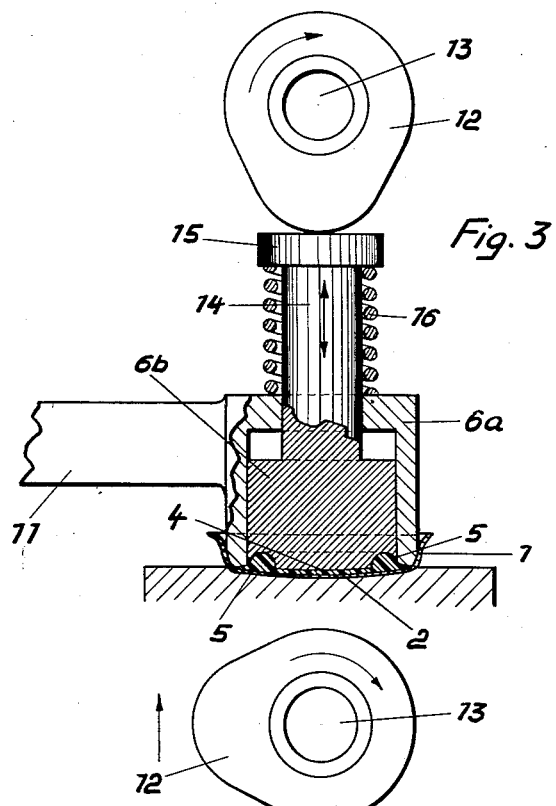
Fig. 3 is a front elevation, partly in section, of the stamping punch structure showing the mandrel in advanced position.
Figure 4:
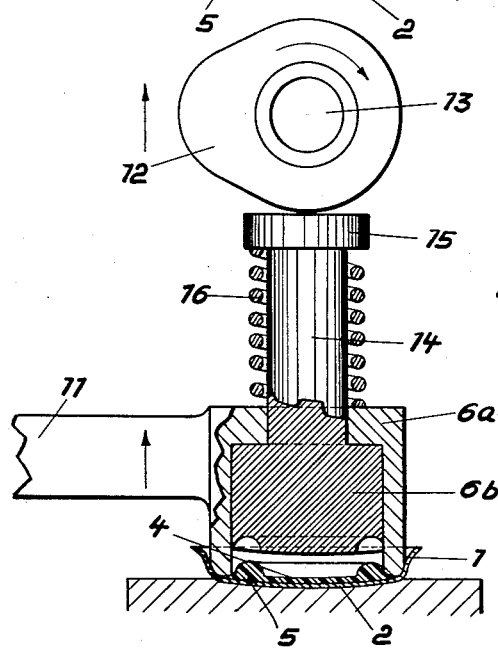
Fig. 4 is a front elevation of the stamping punch structure with withdrawn mandrel upon finishing the sealing insert.

The outer portion of the stamping punch 6a sits on an arm 11. The mandrel 6b is controlled by a cam 12 which is rotatably mounted on a shaft 13. The arm 11 and the shaft 13 perform the same vertical reciprocating movement by means of any suitable known conventional mechanism (not shown). The mandrel 6b receives, however, in addition a movement independent from that of the outer stamping punch portion 6a. The mandrel 6b carries a shaft 14 which is equipped at its upper end with a head plate 15. A pressure spring 16 is disposed between the head plate 15 and the outer stamping punch portion 6a. The device operates in the following manner:

If all parts assume the position shown in Fig. 1 of the drawings, the cap 1, together with the thermoplastic artificial mass 3, is set below the two-part stamping punch. Then, the outer stamping punch portion 6a is moved downwardly and engages with its lower edge tightly the inner wall of the cap 1. In the meantime, the cam 12 moved for about 90°. The portions assume thus a position shown in Fig. 2. Upon further rotation of the cam 12, the mandrel 6b only is pressed downwardly against the action of the spring 16. Due to this operation, the artificial mass 3 is formed to a predetermined shape. A neat center portion 2 is created, which is surrounded by the beaded raised portion 5. The air is pushed outwardly in radial direction and escapes through the slots 8 of the annular face of the outer stamping punch portion in outer direction. Superfluous artificial material may penetrate into the slots 8 of the outer stamping punch (Fig. 3).

Upon still further rotation of the cam 12, the mandrel 6b will rise again. Then all parts return again into the original position shown in Fig. 1. The sealing insert, together with the bead-shaped raised portion, is neatly formed inside of the cap 1.

While we have disclosed one embodiment of the present invention, it is to be understood that this embodiment is given by example only and not in a limiting sense, the scope of the present invention being determined by the objects and the claim.

We claim:

A stamping punch for the manufacture of sealing inserts of thermoplastic artificial material in closing caps for containers, as bottles, said artificial material being adapted to be fed into said caps and to be formed to a predetermined shape, comprising a punch having an outer surface complementary to the inner surface of said caps, said punch comprising a cylindrical hollow body, and a mandrel centrally guided in said hollow body, said hollow body being adapted to locate said cap relative to said mandrel and said cap operating as female die in the formation of said sealing insert, means for joint axial movement of said hollow body and of said mandrel, means for axial movement of said mandrel relative to said hollow body so that said hollow body and said mandrel being axially movable jointly and independently of each other as well as jointly, said hollow body having at its end face a plurality of radially disposed grooves adapted to permit escape of air and of receiving superfluous artificial material during the forming process of said sealing inserts, and said mandrel having at its bottom face an annular recess adapted to receive said artificial material and to form an annular bead on said sealing insert, so that upon lowering of said mandrel within said hollow body said sealing insert is formed to a predetermined shape.

References Cited in the file of this patent

UNITED STATES PATENTS

| | | |
|---|---|---|
| 1,575,300 | Weeks et al. | Mar. 12, 1926 |
| 2,014,815 | Rutledge | Sept. 17, 1935 |
| 2,221,197 | Martin | Nov. 12, 1940 |
| 2,823,422 | Schneider | Feb. 18, 1959 |
| 2,877,493 | Stover | Mar. 17, 1959 |